Patented Feb. 20, 1940

2,190,705

UNITED STATES PATENT OFFICE 2,190,705

CELLULOSE DERIVATIVE EMULSIONS

Alfred Dreyling, South River, and William W. Lewers, Parlin, N. J., assignors to E. I. du Pont de Nemours & Company, Wilmington, Del., a corporation of Delaware No Drawing. Application August 15, 1935,
Serial No. 36,388

8 Claims. (Cl. 106—37)

This invention relates to emulsions and more particularly cellulose derivative emulsions of the "high solids" type. It has been recognized that oil in water emulsions; i. e., those in which water is the continuous phase, are the more important industrially. In the present invention, the colloided cellulose derivative may be considered the oil phase and the water the continuous phase of the emulsion. According to the prior art, emulsions have been prepared by first colloiding the nitrocellulose with a high percentage of essentially water immiscible solvents and/or water immiscible solvent or non-solvent softeners, after which the nitrocellulose colloid is added with rapid agitation to the aqueous phase which also contains a suitable emulsifying agent. The mixture, may, if desired, be run through a colloid mill or homogenizing valve to improve the stability.

The nitrocellulose emulsions of this type heretofore available are, however, subject to several deficiencies, chief of which is the relatively low film-forming solids content, thus limiting their more general industrial adaptation. Satisfactory stability could not be assured, especially when attempts were made to increase the solids content. Frequently, also, excessive amounts of expensive solvents were required.

Emulsions have been prepared in several ways, such as by homogenization, high speed mixing, and low speed mixing. Because of specific limitations imposed on low speed mixing processes as attempted heretofore, high speed and/or homogenization methods only have been utilized. High speed processes can only be used for liquids which are relatively mobile at temperatures of 100° C. or less. Homogenization processes involve the use of a colloid mill or homogenization valve through which the mixture of the constituent ingredients or a preformed emulsion may be passed to form an emulsion which is generally characterized by a product of improved stability.

This invention has as an object an improved aqueous cellulose derivative emulsion, and a process for making the same.

Another object of the invention is the provision of a process for preparing aqueous nitrocellulose emulsions from water wet nitrocellulose.

A further object of the invention is the provision of a process for preparing aqueous nitrocellulose emulsions by the use of a viscous water colloided emulsifying agent.

Another object is the provision of a process for preparing aqueous nitrocellulose emulsions which permits the use of a wide variety of emulsifying agents which may be utilized in combination with an emulsifying agent of the water colloided viscous type; for example, "Glutoline," which is a trade name for a commercial brand of methyl cellulose.

A still further object is the provision of an improved process for preparing aqueous cellulose derivative emulsions by low speed mixing.

Another object is the provision of a process for preparing improved aqueous derivative emulsions by means of kneading type equipment.

A further object of the invention is the provision of an aqueous nitrocellulose emulsion which is high in film forming solids and which, if desired, may contain nitrocellulose of high viscosity characteristic.

A still further object is the provision of aqueous cellulose derivative emulsions which are characterized by good stability.

It is finally an object of the present invention to provide aqueous cellulose derivative emulsions which are industrially useful for coating and impregnating purposes.

These objects are accomplished by kneading a relatively stiff cellulose derivative colloid together with a viscous water colloided emulsifying agent to form a paste type oil in water emulsion of high film forming solids content and of good stability.

In its simplest form low speed mixing procedure consists merely in adding one liquid (the phase to be dispersed) to another liquid (the continuous phase) accompanied by relatively gentle agitation. This method has been suitable only in those instances where the two liquids emulsify readily or where very efficient emulsifying agents are used. The present invention affords a substantial industrial advance in the art of manufacturing cellulose derivative emulsions by providing an improved process for their preparation by low speed mixing. The new process is essentially a modification of and an improvement on low speed mixing methods hitherto available for preparing emulsions, whereby cellulose derivative emulsions in paste form and of high solids content may be readily manufactured.

The following examples are given to illustrate the invention, but it will be understood that they are not limitative since modifications will readily occur to those skilled in the art.

EXAMPLE 1

Colloid #1

| | Per cent |
|---|---|
| Nitrocellulose (viscosity, 15″ Hercules) | 16.85 |
| Isobutyl alcohol | 4.22 |
| Castor oil | 20.00 |
| Tricresyl phosphate | 10.53 |
| Butyl acetate | 11.78 |
| Xylol | 25.13 |

Colloid #2

| | |
|---|---|
| Casein | 1.05 |
| Ammonium ricinoleate | 0.84 |
| Water | 9.60 |
| | 100.00 |

The ammonium ricinoleate contains sufficient excess ammonia to permit the dispersion of the casein. The same is true of the succeeding examples in which soap-casein mixtures are used in the formation of an aqueous colloid (emulsifying agent).

The butyl acetate ingredient shown in this example and in those which follow is 88 to 92% ester calculated as normal butyl acetate, the remainder being principally normal butyl alcohol.

Colloid #1 is prepared by charging the ingredients into a kneading machine such as a Werner and Pfleiderer mixer, in the proportions indicated and kneading for approximately 1½ hours or until the nitrocellulose has been uniformly colloided, after which the charge is removed from the mixer. Colloid #2 may be conveniently prepared by means of a rapid agitator mixer, whereby a homogeneous dispersion is secured. This intermediate dispersion is then charged into a kneading machine and colloid #1 is added gradually during kneading. This kneading action is continued for approximately 2 hours or until a uniform emulsion of paste-like consistency has been obtained.

In this example, the nitrocellulose has been dehydrated with isobutyl alcohol, but suitable emulsions may also be prepared from nitrocelluloses which have been dehydrated with other suitable liquids, such as propyl alcohol, isopropyl alcohol, etc. Ethyl alcohol may be used, although it is not preferred.

EXAMPLE 2

Colloid #1

| | Per cent |
|---|---|
| Nitrocellulose (viscosity, 15" Hercules) | 16.85 |
| Water | 7.22 |
| Castor oil | 20.00 |
| Tricresyl phosphate | 10.53 |
| Butyl acetate | 11.78 |
| Xylol | 25.13 |

Colloid #2

| | |
|---|---|
| Casein | 1.05 |
| Potassium rincinoleate | 0.84 |
| Water | 6.60 |
| | 100.00 |

The ingredients of Colloid #1 are charged into a kneading machine and kneaded until a smooth paste is obtained. Colloid #2 which is prepared separately in a suitable rapid agitator mixer is then added slowly to Colloid #1 in the kneading machine and kneading continued for about 1½ hours or until a smooth uniform emulsion paste is produced.

This example represents a modification of Example 1 and differs therefrom essentially in the use of water wet nitrocellulose in preparing Colloid #1. This is of particular advantage in that the customary step of dehydrating the nitrocellulose is eliminated, thereby affording production economies. In addition the colloiding of the nitrocellulose is greatly facilitated, since the difficultly colloided lumps caused by packing of the nitrocellulose during the dehydration operation are eliminated.

This example is also distinguished from Example 1 in that when Colloid #1 is kneaded, an emulsion is formed with the water as the inside phase. When Colloid #2 is added, and kneading continued, the phase relationship is inverted and the water becomes the outside phase, the condition which has previously been pointed out as industrially desirable. The same situation exists for those examples which follow where water wet nitrocellulose is used in preparing Colloid #1.

EXAMPLE 3

Colloid #1

| | Per cent |
|---|---|
| Nitrocellulose (viscosity, 7.3" Hercules) | 13.7 |
| Water | 6.8 |
| Dibutyl phthalate | 8.2 |
| Isobutyl acetate | 13.7 |
| Toluol | 13.7 |

Colloid #2

| | |
|---|---|
| Synthetic resin* | 10.9 |
| Casein | 1.4 |
| Ammonium rincinoleate | 0.9 |
| Water | 30.7 |
| | 100.00 |

*The synthetic resin used in this example is a reaction product of phthalic anhydride, castor oil, and glycerol in proportions designed to yield a finished product of the following composition:

| | Per cent |
|---|---|
| Glyceryl triphthalate | 63.0 |
| Castor oil | 27.0 |
| Excess glycerol | 10.0 |
| | 100.0 | and is prepared by heating the ingredients until a comparatively low acid number (25 or below) is reached. Obviously, many other resins having a sufficiently low acid number so as to prevent the formation of water colloidable alkaline salts may be substituted for the example given.

The isobutyl acetate shown in this example and in those which follow is 88 to 92% ester calculated as isobutyl acetate, the remainder being principally isobutyl alcohol.

The product of this example may be used in finishing wood surfaces.

The emulsion is prepared in the same manner as shown for Example 2.

EXAMPLE 4

Colloid #1

| | Per cent |
|---|---|
| Nitrocellulose (viscosity, 7.8" Hercules) | 14.45 |
| Water | 7.25 |
| Dibutyl phthalate | 8.70 |
| Butyl acetate | 14.45 |
| Toluol | 14.45 |

Colloid #2

| | |
|---|---|
| Synthetic resin* | 11.55 |
| Locust bean gum | 0.35 |
| Water | 28.75 |
| Ammonia (28%) | .05 |
| | 100.00 |

*The synthetic resin and its preparation in this example is the same as shown in Example 3. The composition may be utilized in finishing wood surfaces or as a thermoplastic adhesive.

EXAMPLE 5

Colloid #1

| | Per cent |
|---|---|
| Nitrocellulose (viscosity, 15.8" Hercules) | 15.50 |
| Water | 6.60 |
| Castor oil | 19.50 |
| Tricresyl phosphate | 6.60 |
| Butyl acetate | 10.80 |
| Xylol | 23.20 |

Colloid #2

| | |
|---|---|
| Turkey red oil | 1.03 |
| "Glutoline" (water colloidable methyl cellulose) | .52 |
| Water | 16.25 |
| | 100.00 |

This example which is prepared as in Example 1 illustrates the use of a combination of two different types of emulsifying agents through which certain advantages are secured. The Turkey red oil acts primarily in lowering the interfacial tension between the two phases; viz., water and the nitrocellulose colloid, while the water dispersable methyl cellulose functions by enveloping the dispersed droplets by viscous or more or less plastic films.

EXAMPLE 6

Colloid #1

| | Per cent |
|---|---|
| Nitrocellulose (viscosity 15.8" Hercules) | 12.85 |
| Water | 5.35 |
| Castor oil | 16.10 |
| Tricresyl phosphate | 5.50 |
| Butyl acetate | 8.90 |
| Xylol | 19.12 |

Colloid #2

| | |
|---|---|
| Gardinol* | 0.17 |
| Glutoline (water colloidable methyl cellulose) | 0.06 |
| Ethylene glycol mono-ethyl ether | 3.40 |
| Water | 28.55 |
| | 100.00 |

*The Gardinol used in this composition is sodium lorol sulphate. This example also illustrates the use of two dissimilar types of emulsifying agents used in combination. The sodium lorol sulphate functions by virtue of its ability to lower interfacial tension and, therefore, reduce the work required to cause emulsification to take place while the methyl cellulose functions as in the preceding example by the formation of an enveloping or stabilizing film around the individual globules constituting the dispersed phase.

The ethylene glycol mono-ethyl ether assists the sodium lorol phthalate in lowering interfacial tension between the water phase and nitrocellulose colloid by virtue of its solubility in both phases. Compounds which function in this manner are known as introfiers.

EXAMPLE 7

Colloid #1

| | Per cent |
|---|---|
| Nitrocellulose (viscosity ½" Hercules) | 21.70 |
| Water | 9.10 |
| Raw castor oil | 27.21 |
| Tricresyl phosphate | 9.23 |
| Isobutyl acetate | 12.45 |
| Xylol | 8.80 |

Colloid #2

| | |
|---|---|
| "Glutoline" | .40 |
| Sodium oleate | .44 |
| Water | 10.67 |
| | 100.00 |

This composition is prepared according to the method given under Example 2 and illustrates the principle that higher solids may be obtained by the use of low viscosity nitrocellulose. As in the two preceding examples, the soap type agent, sodium oleate, functions in lowering interfacial tension, while the methyl cellulose operates as described in Examples 5 and 6.

EXAMPLE 8

Colloid #1

| | Per cent |
|---|---|
| Cellulose acetate (medium viscosity) | 17.6 |
| Dibutyl phthalate | 4.1 |
| Ethylene dichloride | 23.5 |
| Acetylene tetrachloride | 18.8 |

Colloid #2

| | |
|---|---|
| "Glutoline" | 0.3 |
| Water | 33.3 |
| Formamide | 2.4 |
| | 100.0 |

Total solids, 24.4%.

The above example illustrates the operativeness of our invention for formulations containing cellulose acetate as the major film-forming constituent. Here methyl cellulose functions as described previously, while formamide operates as an introfier.

EXAMPLE 9

Colloid #1

| | Per cent |
|---|---|
| Ethyl cellulose (high viscosity type) | 18.21 |
| Dibutyl phthalate | 8.47 |
| Liquid petrolatum | 2.12 |
| Xylol | 21.80 |
| Normal butyl alcohol | 6.01 |

Colloid #2

| | |
|---|---|
| Casein | .24 |
| Ammonium ricinoleate | .72 |
| Methyl cellulose | .13 |
| Water | 42.30 |
| | 100.00 |

The above example illustrates the operativeness of our invention for the preparation of emulsions containing an organosol of ethyl cellulose, with appropriate colloiding agents, as the dispersed phase. The compositions of Examples 8 and 9 are prepared according to the directions given under Example 1.

EXAMPLE 10

Colloid #1

| | Per cent |
|---|---|
| Nitrocellulose (viscosity, 15.8" Hercules) | 20.30 |
| Water | 8.70 |
| Titanox | 13.15 |
| Raw castor oil | 13.15 |
| Butyl acetate | 16.20 |
| Butyl alcohol | 8.60 |

Colloid #2

| | |
|---|---|
| Ammonium ricinoleate | 2.03 |
| Casein | 2.03 |
| "Lanette" wax | .20 |
| Bayberry wax | .20 |
| Water | 15.44 |
| | 100.00 |

The above example illustrates a pigmented nitrocellulose emulsion. A pigment dispersion in castor oil plus solvent was first prepared. Emulsification of this mill base was then carried out concurrently with the dispersion of the nitrocellulose colloid. The mixed waxes, bayberry and "Lanette", were employed in order that textiles coated with the resulting composition may have water repellent properties. In addition the Lanette wax functions as a plasticizer for casein. This composition is prepared according to the directions given under Example 2. "Lanette" wax is a trade name for a wax containing a mixture of monohydric alcohols containing 16 and 18 carbon atoms respectively.

Example 11

Colloid #1

|  | Per cent |
|---|---|
| Nitrocellulose (viscosity, 15 sec.) | 17.9 |
| Water | 7.7 |
| Castor oil | 22.4 |
| Tricresyl phosphate | 7.8 |
| Isobutyl acetate | 31.4 |

Colloid #2

| | |
|---|---|
| Potassium lorol phthalate | 0.3 |
| Animal glue | 0.6 |
| Water | 3.0 |
| Water | 8.9 |
| | 100.0 |

This composition is prepared substantially in accordance with the procedure outlined for Example 2. Colloid #2 is preferably heated to facilitate solution of the glue and it is desirable also to add this colloid slowly at about 40° C. to Colloid #1. As indicated, the last portion of water is added for thinning after inversion of the emulsion has taken place.

The term "lorol" is used to represent the mixture of alcohols obtained from the carboxylic hydrogenation of cocoanut oil or cocoanut oil acids. A similar mixture of alcohols may be obtained from the carboxylic hydrogenation of palm-kernel oil or oil acids.

Example 11 illustrates the use of potassium lorol phthalate as an emulsifying agent. This material has been found to be particularly suited in preparing the emulsions of the type disclosed in the present invention. This agent possesses the peculiar property of functioning with satisfactory results with the emulsion composition at a pH of less than 7.0 as measured by a La Motte comparator, bromthymol blue as an indicator, while in general other emulsifying agents are not considered entirely satisfactory under these conditions. In the example the agent is used in conjunction with animal glue, providing a combination of two distinct types of emulsifying agents affording definite improvements in the preparation of the emulsions and in the properties of finished products. Other alkaline lorol phthalates which are suitable include ammonium and sodium lorol phthalates. Water colloidable emulsifying agents which may be used in conjunction with the alkaline lorol phthalates include gelatine, locust bean gum, gum tragacanth, gum arabic, Glutoline (water colloidable methyl cellulose) gliadin, soaps, casein, etc. Such emulsifying agents are commonly known as water colloidable viscous type emulsifying agents and this term is used in the claims to designate such agents.

While we have disclosed the use of alkali metal lorol phthalates and sulfates as emulsifying agents, in general we may use any of the alkali metal salts of partial esters of polycarboxylic acids and alcohols of the lorol type or those obtainable from the carboxylic hydrogenation of non-drying or semi-drying vegetable oils or the corresponding oil acids. Such emulsifying agents are known as polar type emulsifying agents and this term is used in the claims to designate such agents.

Example 12

Colloid #1

|  | Per cent |
|---|---|
| Nitrocellulose (viscosity, 15 sec. Hercules) | 12.6 |
| Sec. amyl acetate | 16.4 |
| Sec. hexyl acetate | 16.4 |
| Castor oil | 12.6 |
| Boiled linseed oil | 12.6 |
| Carnauba wax | 1.5 |
| Paraffin | 1.0 |
| Water | 8.0 |

Colloid #2

| | |
|---|---|
| Potassium lorol phthalate | .8 |
| Animal glue | 1.7 |
| Water | 16.4 |
| | 100.0 |

In this example the cellulose nitrate is first colloided with the active solvents, secondary amyl acetate and secondary hexyl acetate. The remaining ingredients of Colloid #1 are mixed at a temperature of about 85° C. to dissolve the waxes. Colloid #1 is prepared by emulsifying the cellulose nitrate colloid and the wax-oil mixture according to the procedure outlined under Example 2. The final emulsion composition including Colloid #2 was prepared according to the procedure indicated for Example 2. This composition is particularly suited for coating paper to provide a matte finish.

In preparing cellulose derivative type emulsions, it is usually necessary to colloid the cellulose derivative with solvents, plasticizers, etc., previous to emulsification in order to place it in a fluid condition so that it may be emulsified. A proportion of a suitable solvent must be included in order to permit coalescence of emulsion globules after deposition to form a continuous film. An exception may be where there are sufficient thermoplastic ingredients present to afford the formation of a continuous film by a subsequent application of heat.

In preparing film forming emulsions in solution form the solvents should be substantially non-miscible and entirely non-reactive with water. They should also be stable in systems wherein the outside phase is either slightly acidic or basic, the degree of stability necessary in any particular case depending on the specific requirements which the emulsion is designed to fill; and, furthermore, in cases where the deposition of a continuous film is required, the solvent must have a sufficiently high vapor tension and latent heat of vaporization to be retained in the film until after the evaporation of the water phase is complete.

Solvents for the cellulose derivatives (nitrocellulose, cellulose acetate and the cellulose ethers) which are operable in the present invention are secondary hexyl acetate, secondary octyl acetate, butyl acetate, isobutyl acetate, amyl acetate, isoamyl acetate, ethylene dichloride, xylol, acetylene tetrachloride, etc. As illustrated in the examples, suitable softeners, of the solvent and non-solvent type, may also be employed. Such materials as dibutyl phthalate, tricresyl phosphate, raw or blown castor oil, blown linseed oil and other blown, drying, semi-drying and non-drying oils may be incorporated in the compositions. Diluents either of the aromatic hydrocarbon or aliphatic hydrocarbon type such as toluol, xylol, high flash naphtha, as well as the cyclic aliphatics obtained from asphaltic crude oils, may be included as indicated in the examples.

In conventional lacquer technology use is made of certain monohydric alcohols such as ethyl alcohol, butyl alcohol, isobutyl alcohol, secondary amyl alcohol, etc., which in themselves are not solvents for cellulose nitrate as fortifying solvents for the same. It has been found that certain of these alcohols which may be either wholly or partially water miscible are distinct assets in emulsification due to the fact that they lower the interfacial tension between the phases. In addition numerous other liquids soluble in both phases function in this manner decreasing the work required to effect dispersion and adding to stability. Alcohols of this type are commonly known in the art as introfiers and a definition closely resembling the above will be found in the "Laboratory Manual of Colloid Chemistry" by H. N. Holmes, published by John Wiley and Sons, New York (1934), pages 115 and 167.

It is extremely important therefore in our process dealing with the formation of high solids nitrocellulose colloid oil in water type emulsions that in order to insure finished products of maximum stability that a portion at least of the medium effecting the dispersion of the nitrocellulose (as an organophilic colloid) be capable of miscibility with the aqueous phase to an extent sufficient to permit the reduction of interfacial tension between the phases to a point where emulsification will be facilitated. The significance of the above is further emphasized by the fact that if the organic material selected as a solvent for the nitrocellulose (or more properly to effect the colloidal dispersion of the nitrocellulose) does not possess a certain degree of water miscibility as an inherent characteristic, then in the above described process at a point known as the first stage (the water in oil stage) instead of forming a well dispersed water in oil emulsion suitable for subsequent inversion, water separates from the system either in whole or in part with the formation of a dilute imperfectly dispersed water in oil emulsion which is difficult or impossible to invert. While it is recognized that such a product may be utilized to perform certain useful functions the conditions requisite to its formation are to be avoided in the practice of our invention involving the formation of high solids oil in water emulsions of colloided cellulose derivatives.

The foregoing examples illustrate the use of nitrocelluloses of a wide range of viscosity characteristics, depending upon the designed utility of the ultimate emulsion composition. Nitrocelluloses of viscosity characteristics ranging between ⅛ sec. and 25 secs. as determined by A. S. T. M. specifications D-301-33 may be successfully employed. Likewise, the viscosity characteristic of the cellulose acetate or cellulose ether is not critical, since suitable emulsions may be prepared from these materials whether of high or low viscosity characteristic.

The nitrogen content of the nitrocellulose utilized in preparing the emulsions of the present invention is not critical, and may vary between 10% and 12.5% depending upon the particular use for which the ultimate emulsion composition is intended.

The invention is not limited to the use of nitrocellulose in any specific form, since any of the commercially available types in addition to the common nitrated linters, such as nitrated wood pulp, nitrated regenerated cellulose, smokeless powder, etc., may also be utilized.

While stable dilute emulsions have been made which are composed merely of two non-miscible liquid phases, the preparation of a stable concentrated emulsion requires the presence of a third substance which is termed an emulsifying agent. These agents cover a wide range of different chemical types including sulfonated organic compounds, fats and their chemical derivatives (not sulfonated), natural organic products other than fats and their derivatives, synthetic chemical agents and inorganic agents. In addition to functioning as an emulsion stabilizer, the agent also exerts a governing influence on the phase relationship. In contradistinction to prior art processes, where specific emulsifying agents are generally required, the process of the present invention permits the use of a wide variety of emulsifying agents, which may be used singly or in combinations depending upon the final effect desired.

It has been determined that there are two distinct types of emulsifying agent which have shown merit in the present process and which apparently function in different ways. Both types of agents belong to the more general group of so-called colloidally dissolving emulsifying agents which includes soaps, resinates and caseinates of mono-valent alkaline metals, ammonia or organo substituted ammonias, gelatine, glue, albumin, hemoglobin, gliadin, protein hydrolysis products (such as peptones, gelatoses), water-soluble gums and mucilages (such as arabic, tragacanth, Irish moss, locust bean and the like), colloidal carbohydrates (such as starches, dextrine, etc.), carbohydrate ethers such as water colloidable methyl cellulose, methyl starch and the like, alkaline salts of various types of sulfonated oils and sulphated higher alcohols such as Turkey red oil and "Gardinol", respectively, and the like, as well as the mono-valent alkaline salts formed by the neutralization of the acid esters formed by reacting dibasic acids with one molecular equivalent of higher alcohol. The above agents may be divided into two distinct types with reference to which one of the following two characteristics, viz. interfacial tension lowering or bodying action, appears the more prominent. The emulsifying agents which exhibit strong interfacial tension lowering tendencies are called polar type emulsifying agents, whereas those which dissolve colloidally in water and increase the viscosity or body of the dispersion to a large extent are called water colloidable viscous type emulsifying agents.

The organic compounds containing polar groups function in two ways. Primarily, they lower the interfacial tension between the two liquids, thus causing one liquid to disperse with respect to the other and in addition afford some viscosity increase to the phase in which they are the more soluble, which is also desirable.

As illustrated in the examples, the emulsions may include more than one emulsifying agent, which may also be of different types. In certain instances, the inclusion of three different emulsifying agents has been found advantageous. In any event, it is essential that at least one of the emulsifying agents be of the water colloided viscous type in order to insure adequate body or consistency to form the paste type emulsion.

In connection with the inclusion of more than one emulsifying agent in a single emulsion composition, it has been demonstrated that changes in the emulsifying agent only will substantially alter the properties of otherwise similar emulsions to such an extent in one case the emulsion will penetrate into the surface (porous or semi-porous) to which it is applied, whereas by using a different type of emulsifying agent, the coating will remain substantially on the surface. It has been determined that soap type emulsifying agents permit rapid and deep penetration into porous or semi-porous surfaces, while materials of the methyl cellulose type yield emulsions that act principally as surface coatings.

The products of the present invention are of particular value in coating the backs of rugs and carpeting. This is preferably carried out by reverse roller coating in conjunction with a doctor knife, although other methods of application are also permissible such as spray coating or knifing operations. When one of the compositions herein disclosed is used, the coating binds the fabric pile of the carpeting, giving the semblance of a closer weave. The use of such coatings permits a less expensive weave if desired; and, in any event, the strength of the weave is increased and an improvement in general durability of the product is secured. Ravelling tendencies, usually encountered when uncoated carpeting is cut, are entirely eliminated.

Nitrocellulose solutions, as distinguished from nitrocellulose emulsions, have several defects which are eliminated in using the compositions of the present invention. With the improved coatings, the appearance and "hand" of the coated carpeting is substantially unaltered. The new compositions also present fewer industrial hazards, since the vehicle contains appreciable quantities of water, and the loss of expensive volatile solvents is thereby greatly reduced and the need for solvent recovery systems is avoided.

In addition, it has been determined that the high solids compositions of the present invention will coat a greater area of carpet backing surface than a conventional nitrocellulose lacquer of equal solids.

The improved compositions are also of value in coating and impregnating a great variety of articles of manufacture: paper, textiles, fabrics, cloth, wood and metal surfaces have likewise been successfully coated and/or impregnated with these cellulose derivative emulsions. In coating wood surfaces, it is desirable to first apply a water resistant primer coating. A further commercial usage is indicated in the application of emulsions to the surface of linoleum. The products may also be used as adhesives which function by evaporation of the volatile constituents or they may also be prepared to function as heat energizable cements. In this connection, they are of particular merit in laminating cloth and other fabrics, joining shoe parts in the manufacture of cemented shoes, laminating paper, regenerated cellulose sheeting, manufacture of plywood, etc. The emulsions may be used to produce clear, substantially colorless finishes or they may be colored with suitable pigments or other coloring matter to afford decorative effects.

The process of the present invention is of considerable advantage in that low speed agitation may be used thus greatly simplifying industrial operation and permitting the use of less expensive equipment.

The use of nitrocellulose of high viscosity characteristic is permitted as is nitrocellulose wet with water, thus extending the industrial usefulness of aqueous nitrocellulose emulsions and further simplifying production operations.

The emulsions of the present invention are also particularly characterized by high film-forming solids content and improved stability.

A further advantage resides in the shipping and storage considerations, since it is obviously desirable to avoid the presence of excessive amounts of water from the economic standpoint.

The new products are quite stable during shipping and extended storage periods and because of their paste-like condition greatly reduce settling and hard caking of pigments, when of the pigmented type.

The process is adapted for the preparing of cellulose derivative emulsions either by the method of direct preparation of oil-in-water emulsions or by the inversion method.

The process permits of the use of a wide variety of emulsifying agents of various types which may be conveniently utilized in conjunction with the water colloided viscous type such as "Glutoline", casein or glue. In addition, the fire and explosion hazards commonly incident to the use of nitrocellulose lacquers are considerably lessened if not entirely eliminated.

It is apparent that many widely different embodiments of this invention may be made without departing from the spirit and scope thereof; and, therefore, it is not intended to be limited except as indicated in the appended claims.

We claim:

1. The process of preparing oil in water emulsions having about a 25% to 60% non-volatile content and which is of paste-like consistency which comprises preparing a cellulose derivative solution in a water-immiscible and water-inert organic solvent, preparing a water dispersion of two colloidally dissolving emulsifying agents, one of which is of the polar type and the other of which is of the water colloidable viscous type, and combining the said cellulose derivative solution and the said dispersion of emulsifying agents by low speed mixing in a kneading machine.

2. Process of claim 1 in which the cellulose derivative is water-wet cellulose nitrate.

3. Process of claim 1 in which the polar type of emulsifying agent is an alkali metal lorol phthalate and to which is added an alcoholic introfier.

4. Process of claim 1 in which the cellulose derivative is cellulose nitrate and the polar type emulsifying agent is potassium lorol phthalate.

5. An oil in water emulsion of paste-like consistency prepared in accordance with the process of claim 1, said emulsion having a plurality of ingredients, the non-volatile content of which is the order of 25% to 60%, the predominating solid ingredient of which is a cellulose derivative dissolved in a water-immiscible and water-inert organic solvent, and as minor ingredients a plurality of colloidally dissolving emulsifying agents one of which is of the polar type and the other of which is of the water colloidable viscous type whereby an emulsion is obtained which is characterized by excellent stability.

6. Product of claim 5 in which the emulsion contains a resin.

7. Product of claim 5 in which the cellulose derivative is cellulose nitrate.

8. Product of claim 5 in which the polar type emulsifying agent is an alkali metal lorol phthalate and to which an alcoholic introfier is added.

ALFRED DREYLING.
WILLIAM W. LEWERS.